United States Patent [19]

Case, Jr. et al.

[11] Patent Number: 4,488,032

[45] Date of Patent: Dec. 11, 1984

[54] ARC WELDING TORCH WITH INTEGRAL VISION SENSOR

[75] Inventors: Allen W. Case, Jr., Amsterdam; Norman R. Kuchar, Burnt Hills; Donald C. Peroutky, Schenectady, all of N.Y.

[73] Assignee: General Electric Company, Schenectady, N.Y.

[21] Appl. No.: 619,432

[22] Filed: Jun. 11, 1984

Related U.S. Application Data

[63] Continuation of Ser. No. 401,471, Jul. 26, 1982, Pat. No. 4,450,339.

[51] Int. Cl.³ .............................. B23K 9/10
[52] U.S. Cl. ................. 219/124.34; 219/75; 219/130.01; 219/130.21; 358/101
[58] Field of Search ........ 219/130.01, 124.34, 219/130.21, 136, 74, 75; 358/901, 101; 901/42, 47

[56] References Cited

U.S. PATENT DOCUMENTS 3,020,806 2/1962 Castrucci .......................... 88/72
3,590,213 6/1971 Caldwell ......................... 219/130
4,306,148 12/1981 Ringwall et al. ................. 250/229

OTHER PUBLICATIONS

S. H. Rao, CWR Technical Report 529613-81-3, Ohio State University, Sep. 1981, pp. xi, xii, 1-5, 24-41.
Fiber-Optics Couple Arthroscope to TV, NASA Tech. Briefs, vol. 5, No. 4, Fall 1980, pp. 462, 463.

Primary Examiner—Clifford C. Shaw
Attorney, Agent, or Firm—Donald R. Campbell; James C. Davis, Jr.; Paul R. Webb, II

[57] ABSTRACT

A gas tungsten arc welding torch has an integral optical system which images the weld puddle on the face of a fiber optic cable, and is suitable for industrial welding. The copper torch body has cover gas, electrical power, and coolant connections and an integral slim profile electrode holder. The optical lens is located directly above the electrode; the holder is out of focus and is not seen in the image of the weld region. A concentric torch configuration is more compact and has a large field of view at the weld area. When coupled to a remote video camera and monitor components, the torch-vision system permits control of torch manipulation and of the weld process.

14 Claims, 12 Drawing Figures

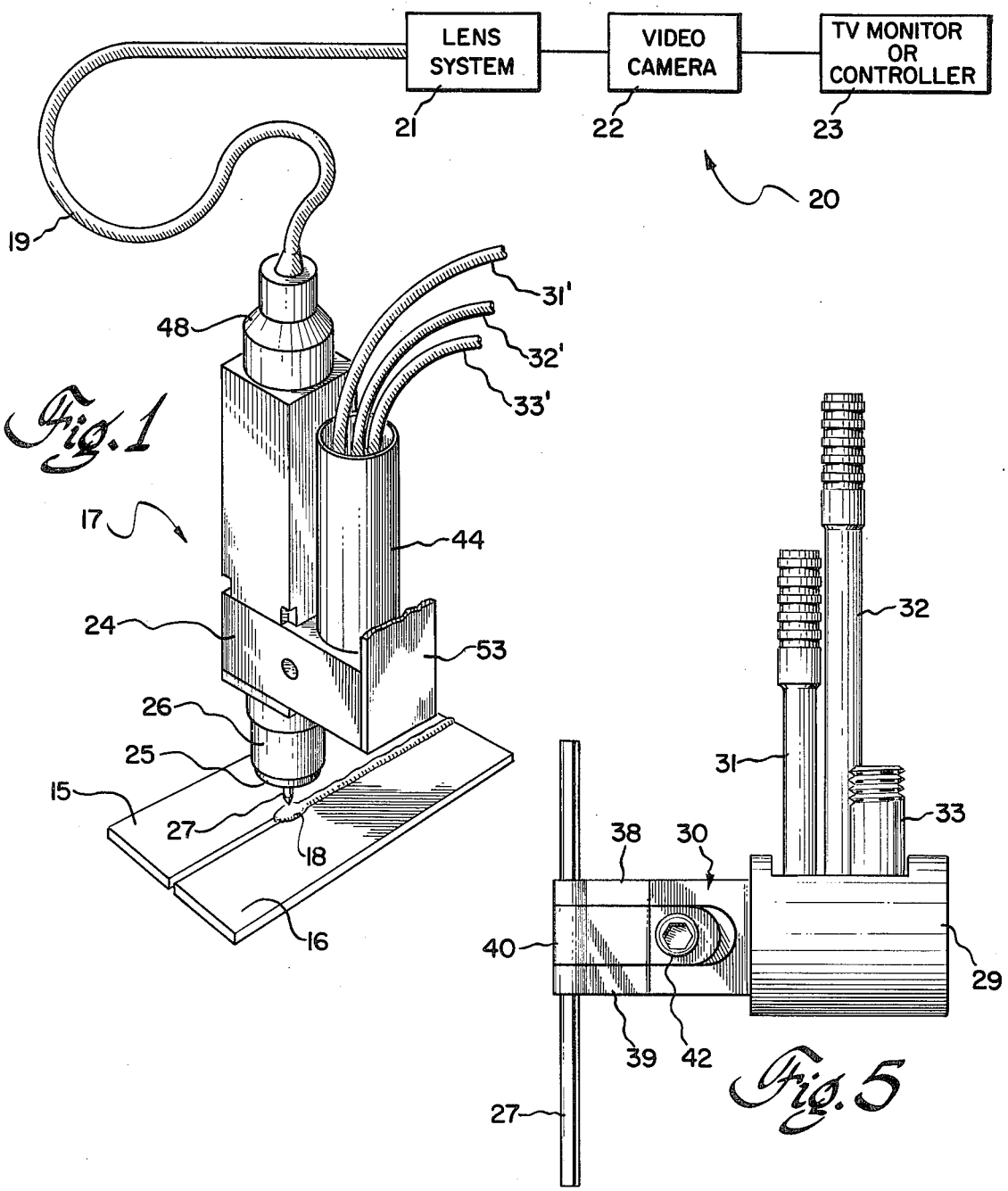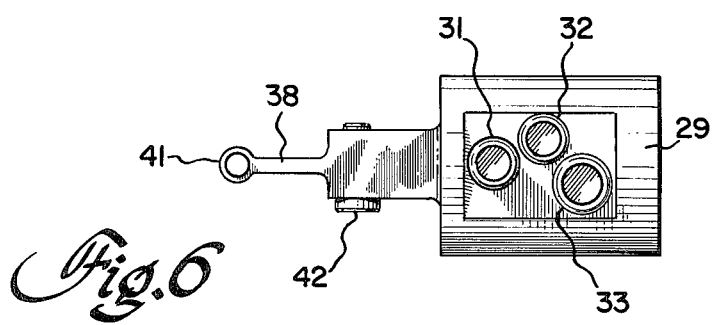

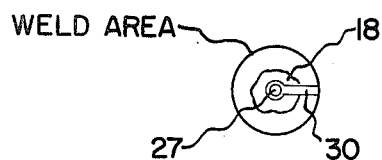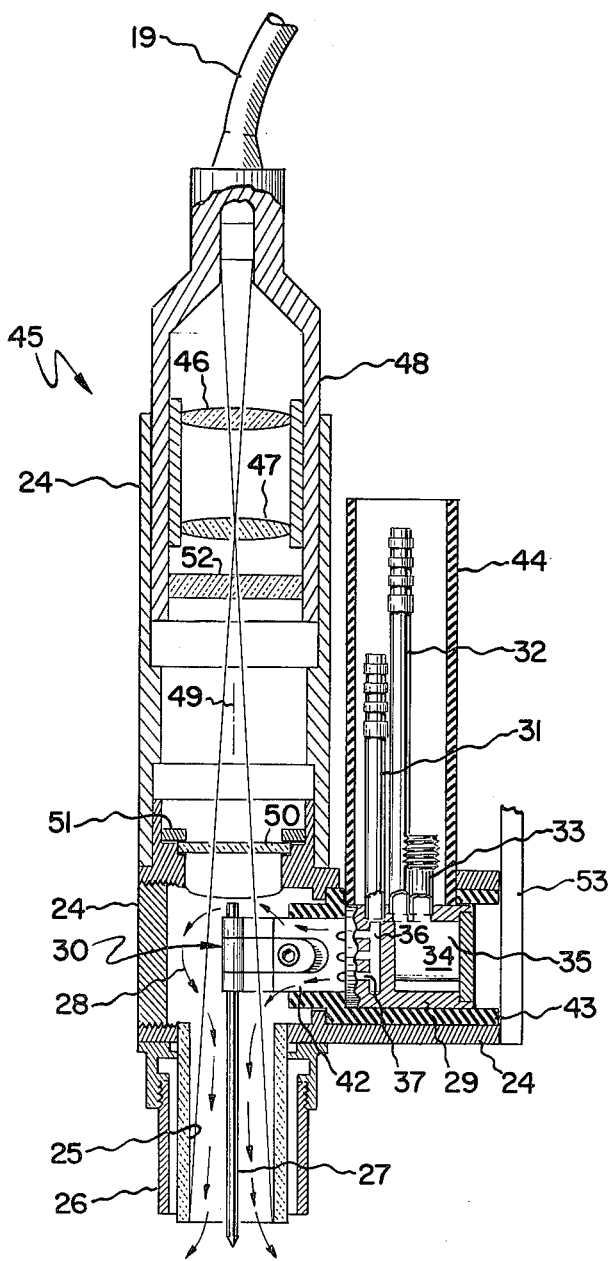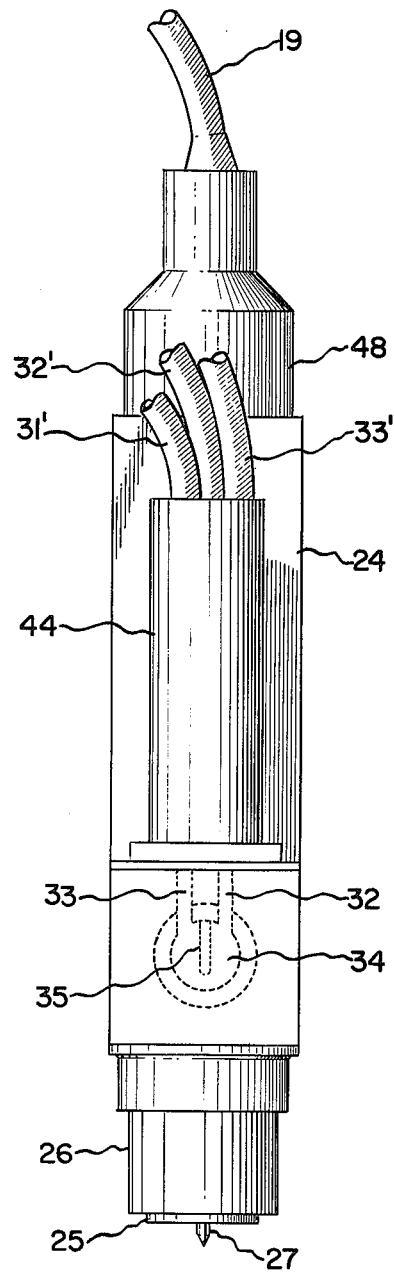

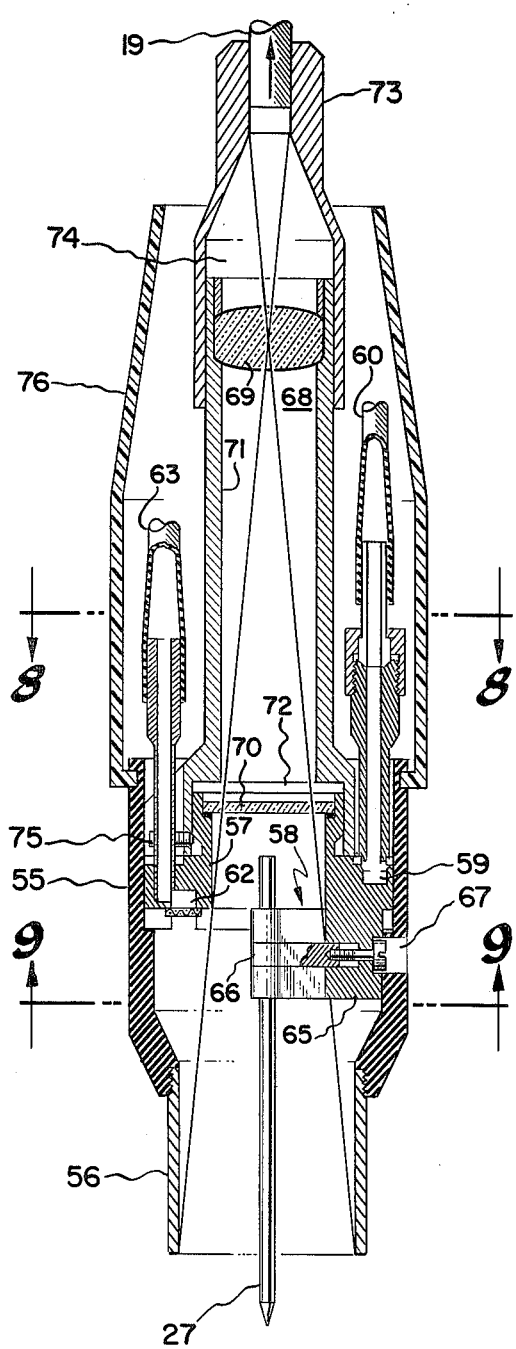
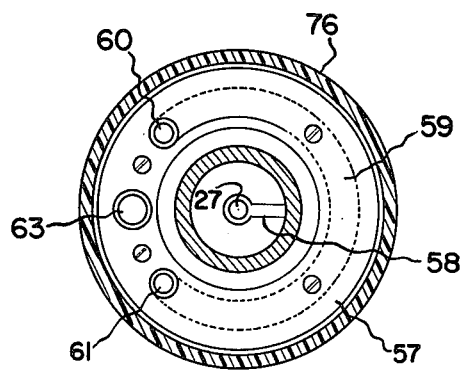
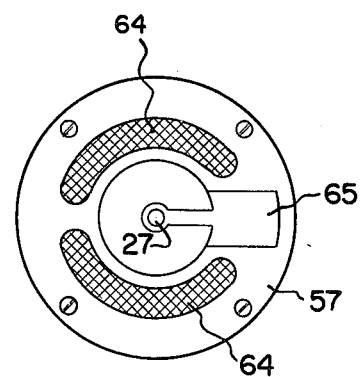
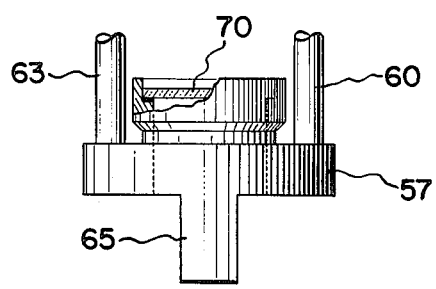

ARC WELDING TORCH WITH INTEGRAL VISION SENSOR

This application is a continuation of application Ser. No. 401,471, filed 7-26-82 now U.S. Pat. No. 4,450,339.

BACKGROUND OF THE INVENTION

This invention relates to electric arc welding and especially to an arc welding torch with a built-in optical system which permits real time observation of the weld puddle.

Good arc welds are achieved by controlling weld current, weld penetration, centering of weld puddle over part seam, weld bead lay rates, etc. When welding manually, the operator observes the welding process from an oblique angle and attempts to manipulate the weld torch and power supply adjustments to obtain good welds on the basis of intuition and prior experience. With machine welding, weld parameters are averaged based on past experience, and the machine programmed to weld with these inputs. Often this open loop machine welding does not produce good welds. For consistently good machine welding, some means for sensing weld puddle characteristics and using this information as feedback to control the welding process is needed.

Some experiments have been conducted at the Ohio State University Center for Welding Research in which the weld puddle has been viewed by an overhead optical system looking down over the welding electrode. In these experiments, the welding torch, open optical system, and video camera were carried on a large platform unsuitable for any practical welding application. The welding torch itself is conventional except that the lower part and electrode are bent through 90° and provided with a window. See CWR Technical Report 529613-81-3, S. H. Rao, September 1981, pages 27-33.

SUMMARY OF THE INVENTION

The electric arc welding torch with integral optical system has a configuration which makes it suitable for industrial welding. When used in machine welding applications with robotic control, the vision sensing capability of this torch can be used as a feedback element to control torch manipulation or power supply adjustment to achieve consistently good welds.

A gas nozzle and the optical vision system are supported by a housing and the region between them is substantially unobstructed to passage of light. The metal torch body has cover gas, electrical power and coolant connections, and an integral electrode holder that secures the electrode approximately in the center of the gas nozzle on the optical axis and whose cross section perpendicular to the optical centerline is relatively small. The vision system provides an image of the weld puddle and weld area; the holder is out of focus and not evident in the image. Means such as a fiber optic cable transfers the image to a remote system which includes a video light camera. The slim profile electrode holder is in the form of a projecting or radial arm; it has stationary and movable arms that cooperate to clamp the electrode.

One embodiment of the gas tungsten arc welding torch with a vision attachment has the optical lens located directly over the electrode, sealed from the cover gas by a transparent window. The copper torch body is at one side of the optical centerline. A modification of this torch has a folded vision attachment and is useful in welding inside pipes and regions with restricted access. Another embodiment is a concentric configuration; this torch is more compact, lighter in weight, has a wider field of view at the weld region, and provides a lens effect in the cover gas flow for more effective gas shielding. The torch has a ring-shaped torch body and integral radial arm electrode holder; the optical system is directly above the electrode as in the first embodiment, and the gas, electrical power, and coolant connections are concentric to the lens housing.

BRIEF DESCRIPTION OF THE DRAWINGS

FIG. 1 shows seam welding with a gas tungsten arc welding torch which has a vision attachment and remote viewing system;

FIGS. 2 and 3 are a vertical cross section and side view of the GTAW torch and integral optical system;

FIG. 4 is a view of the weld puddle and weld area through a window in the torch;

FIGS. 5 and 6 are side and top views of the copper torch body with integral electrode holder;

FIG. 7 is an axial cross section through a concentric arc welding torch and integral optical system;

FIGS. 8 and 9 are horizontal cross sections of the torch taken approximately on lines 8—8 and 9—9 in FIG. 7;

FIG. 10 is a partial side view and cross section of the torch body and window in FIG. 7.

DETAILED DESCRIPTION OF THE INVENTION

Figure 11:
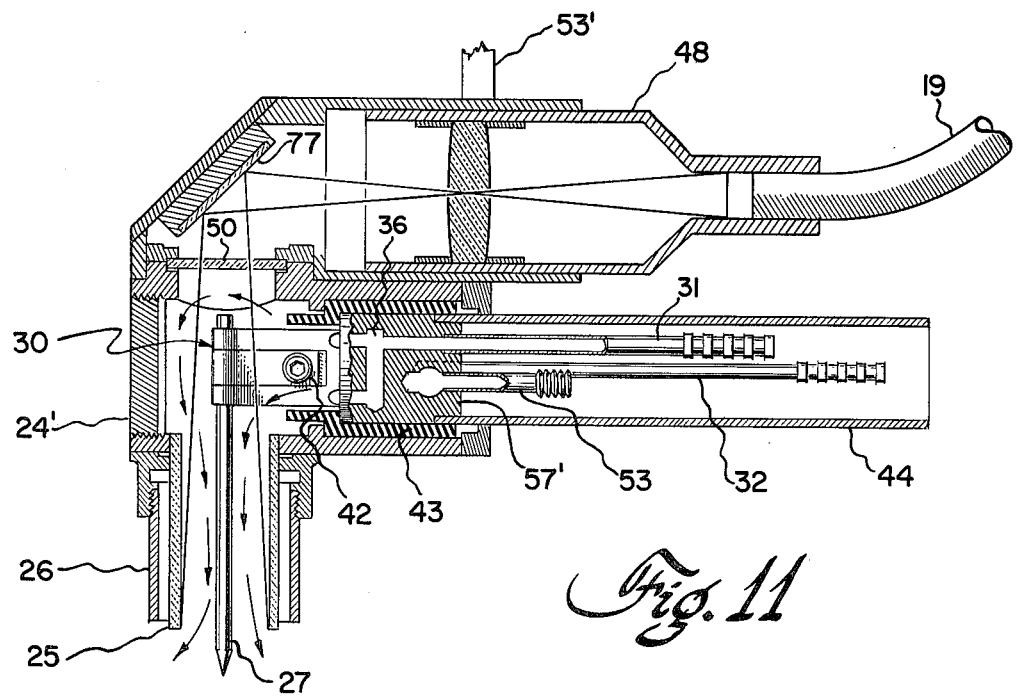
FIGS. 11 and 12 are a vertical cross section and side view of a third embodiment which has a folded vision attachment.
Figure 12:
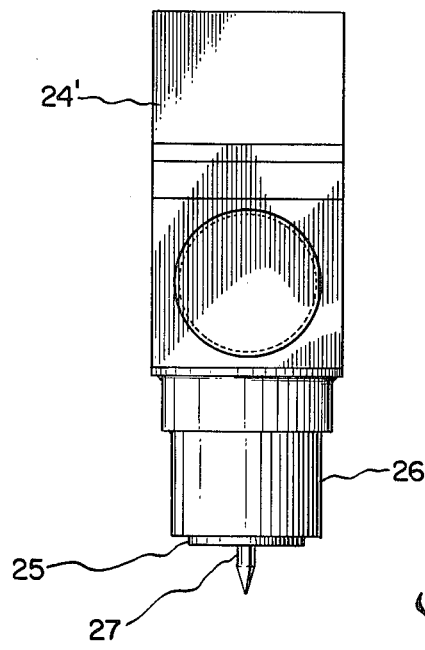

In FIG. 1, seam welding of workpieces 15 and 16 is illustrated using an electric arc welding torch 17 that has a built-in optical system. The weld puddle 18 and adjacent weld region are imaged on the face of a fiber optic cable 19 and the image is transferred to a remotely located system 20. One of these is that the image is magnified by a lens system 21 and projected onto a video camera 22 such as General Electric's TN 2500 Charge Injection Device Camera, and the output is sent to a television monitor 23 where the image may be viewed. Alternatively, the video output is fed to a controller and used in a feedback arrangement to control movement of the torch and the welding process to achieve consistently good quality welds.

One embodiment of the gas tungsten arc welding (GTAW) torch with an integral optical system is shown in FIGS. 2-6. This torch is a configuration which can be used for welding in almost all applications in which a conventional gas tungsten welding torch is used. The torch has a water cooled copper torch body with an integral slim profile electrode holder and with means for providing cover gas flow to the weld region. An optical lens is located directly over the electrode to image the weld region on the face of the fiber optic cable. The torch and optical components are supported in a compact enclosure.

At the lower end of metal housing 24, FIG. 2, is a cylindrical ceramic gas cup or nozzle 25 which is surrounded by a metal annular gas cup 26. The replaceable tungsten electrode 27 is at the center of gas cup 25, approximately on the optical centerline. Cover gas flow is indicated by arrows 28; the electrode, the weld puddle, the arc, and adjacent heated areas of the workpieces are protected from atmospheric contamination by the gaseous shield. The cover gas is usually an inert gas such as argon or a mixture of gases.

The copper torch body 29 has an integral electrode holder 30 and gas, water, and electrical power connections 31–33. For a compact configuration, the torch body 29 and holder 30 position the electrode 27 on the optical centerline, and the gas, water, and electrical connections 31–33 emerge close to and parallel with the optical system. Unlike conventional electrode collets which occupy a large region around the electrode, the electrode holder 30 of this torch provides for a minimum cross section perpendicular to the optical axis consistent with holding the electrode securely and providing adequate conduction area for, say, a 200 ampere electrode current flow. Looking also at FIGS. 3, 5 and 6, the round torch body 29 has an interior water chamber 34 with a central baffle 35 to provide maximum contact of water with the torch body and optimum cooling of the assembly. Incoming water or other coolant passing through the threaded tube 32 into chamber 34 must pass under the baffle 35 in order to exit through the tube 33. The latter has a dual function as the electrical power connection; typically the hose coupled to the fitting, through which water flows, has a metal braid jacket which conducts the power. Cover gas flows from the threaded copper pipe 31 into a separate passage 36 (FIG. 2) and out through orifices 37 to the interior of the welding torch. Cover gas flow emerges from the torch body 29 on both sides of the electrode holder 30 to impart minimum turbulence to gas flow down through the gas cup 25. Laminar flow is preferred to achieve good shielding.

The slim profile copper electrode holder 30, which is a projecting arm or chuck, has three parts. Stationary arms 38 and 39 of the holder are integral with the torch body 29, and the center arm 40 is movable. All three parts have a ring 41 at the end of the arm into which the tungsten rod electrode 27 is inserted. Movable arm 40 is used to force the electrode tightly against stationary arms 38 and 39 by the action of a clamp screw 42 when it is tightened. This clamp screw 42 is accessible through a hole in the side of the torch support framework housing 24, to permit easy changing of electrodes. An insulating sleeve 43 (FIG. 2) electrically insulates the torch body 29 from the metal housing 24, and provides sufficient flashover distance to prevent arcing from the torch body to the metallic framework during high voltage weld arc starting. An open-ended insulating tube 44 encloses the gas, water, and power connections.

The torch's integral optical system is indicated at 45. The compound lens system 46, 47 that is shown (25 mm focal length, f 1:1.4) is a good compromise between physical size, aperture opening, and depth of field for weld puddle viewing. It is enclosed in a cell housing 48 which can be moved axially to focus on the weld spot for a reasonable (one-half inch) range of electrode extension beyond the gas cup 25. The optical axis 49 is approximately aligned with the center of gas cup 25 and with tungsten electrode 27. The optical path penetrates a quartz window 50 which seals the optics from the cover gas. This transparent, heat reflecting window is retained in the housing 24 by a ring 51. A filter region accommodates one or more optical filters 52 which are either infrared radiation blocking filters or neutral density filters. Preferably, a small visible range of light is transmitted to the video camera. The lens housing 48 contains a cylindrical cavity which holds the end face of fiber optic cable 19 on the lens optical axis 49 and at a spacing to give the desired image demagnification.

FIG. 4 is a view of the weld area through quartz window 50. The weld puddle 18, tungsten electrode 27, and slim profile electrode holder 30 would be seen if one looked down through this window. However, the electrode holder 30 is located sufficiently far from the optical focus region at the weld puddle to provide minimum optical distortion of the puddle image on the face of the optical cable 19. That is, in the image of the weld puddle and weld area, the electrode 27 is seen, but the electrode holder 30 is out of focus and is not evident in the image or is barely visible.

Referring to FIG. 1, the gas supply line 31', water line 32', and water/power cable 33' plus the fiber optic cable 19, are made to exit away from the weld area. A mounting bracket 53 attached to the metal housing 24 permits mounting the welding torch 17 to any available mounting configuration, such as the wrist or arm of a robotic machine. A commercially available coherent fiber optic cable 19 is used; the image picked up at one end of the cable is transmitted faithfully to the other end. One GTAW torch 17 with a vision attachment that was built had an overall length of about 7.25 inches.

A concentric gas tungsten arc welding torch with an integral optical system is illustrated in FIGS. 7–10. The torch-vision system of this second embodiment is similar in function to the torch in FIGS. 1–6 but incorporates a more compact configuration, is lighter in weight, has a wider field of view at the weld region, and provides for a lens effect in the cover gas flow for more effective gas shielding. When the fiber optic cable of this torch is coupled to a video recording or viewing system, real time observation of the weld puddle can be made and utilized to control the weld process. An insulating housing 55 has an attached metal gas cup and nozzle 56, and supports a ring-shaped torch body 57 with an integral, slim profile electrode holder 58. The upper half of copper ring 57 contains a water flow channel 59. Water enters one end of the channel 59 through a tube 60 and exits the other end through another tube 61. The first of these has a metal braid jacket to conduct electrical power to the torch in addition to cooling water.

The lower half of copper ring 57 contains a gas flow channel 62. Welding cover gas enters the channel through a tube 63, and gas exits through the gas lens 64 and through the torch gas cup 56 to cover the weld region. The gas lens consists of a permeable barrier of multiple fine mesh metal cloth screens which provide a laminar, stable stream of shielding cover gas. By reducing turbulence and focusing the gas into a coherent stream, the covering ability of the shield gas is effective at greater gas cup to workpiece distances than is possible without the lens. One gas lens 64 has eight layers, alternating 100 mesh wire cloth and 250 mesh wire cloth. The tungsten electrode 27 is secured to the torch body 57 with a slim profile, radial arm holder 58 which presents minimum obstruction to the light passage through the optical system. Copper ring 57 has a downwardly projecting dog leg 65 (FIGS. 9 and 10) which supports the radial arm electrode holder 58. Like in the previous embodiment, the holder has two stationary, projecting arms between which is a movable part 66. All three arms have a ring at the end through which electrode 27 is inserted and clamped in place. Turning electrode lock screw 67 moves center arm 66 radially.

The built-in optical system 68 has a single lens 69 which images the weld region on the face of fiber optic bundle 19 by means of which the image can be conveniently transferred to a remote viewing system. The optical system looks at the weld region through the center of the ring-shaped torch body 57. The electrode holder 58 is sufficiently far removed from the focal plane of the optical system 68 so that it is not evident in the viewed image. A quartz window 70, which is transparent and heat reflecting, is located between the torch body 57 and the optical lens 69 and prevents gas flow in any direction except out through the gas cup 56. The lens 69 is fixed to a removable, metal, cylindrical lens housing 71 which is fastened to the top of torch body 57 by means of lock screws 75, and between them is the quartz window 70 and one or more optical filters 72. Lens housing 71 is at the same potential as the torch body 57 but conducts substantially no current. Lens 69 is, for example, a Hastings triplet with a 25 mm focal length and a 15 mm diameter. It has an aperture and focal length to just image a one inch diameter field of view on the full face of a 0.2 inch fiber bundle with an approximately ±0.25 inch depth of field.

The optical system 68 has a fixed lens but the fiber optic cable 19 is adjustable to focus the image of the weld puddle and weld area on the face of the cable. An insulating bundle housing 73 slides down over lens housing 71 and has an interior stop 74. The end of cable 19 is received in a cylindrical cavity in the top of the bundle housing.

The gas, coolant, and electrical power connections 60, 61, and 63 are outside of and concentric with the lens housing 71. The three copper tubes are inserted into holes in the top of ring 57 and held in place by soldering. An insulating plastic sleeve 76 covers the gas, coolant, and power connections and optical housing 71. The concentric configuration and novel structure of the torch shown in FIGS. 7-10 makes for a compact lightweight device, not unlike a conventional welding torch, but having a built-in optical system which conventional torches do not have.

The third embodiment, a GTAW torch with a folded vision attachment, has a configuration which can be used for welding applications with restricted access such as is frequently encountered in orbital arc welding of pipes in the nuclear power industry. When used in this and similar applications, the vision sensing capability of this torch system can be used to inspect weld quality or as a feedback element to control torch manipulation. The folded optical system, which minimizes system height over the weld region (say to four inches), is provided to image the weld region on the face of the fiber optic cable. This torch is a modification of the embodiment in FIGS. 1-6, and the same elements are identified by the same numerals. The optical path, after penetrating the quartz window 50, is folded 90° by a mirror 77 mounted on the inside of housing 24' above the tungsten electrode 27. The lens cell is the same as in FIG. 2 but at right angles to the electrode 27 and gas cup 25, and has a single lens and a pocket for accommodating optical filters. Lens housing 48 is adjustable axially in both directions and the end of the housing has a cylindrical cavity containing the fiber optic cable 19. Mounting bracket 53' is attached to top of an upper horizontal part of housing 24'. The shape of torch body 57' is different to accommodate horizontal connection of the gas, water, and power tubes 31-33, but the integral slim profile electrode holder 30 is the same as previously described. The view of the weld area through the quartz window of the torch with folded integral vision system is as shown in FIG. 4. A typical torch has a height of 3.9 inches and a 5.35 inch horizontal dimension.

In conclusion, the electric arc welding torch with integral vision sensor has a unique configuration which makes it suitable for industrial welding. The active weld puddle and weld area are directly viewed by optical means. The center of the torch is cleared and presents minimum obstruction to passage of light and the electrode holder has a small cross section perpendicular to the optical axis and is out of focus in the image. The built-in vision sensor is needed in systems which control the movement of the torch and the welding process to achieve reliable machine welds. The invention has application to metal inert gas (MIG) and tungsten inert gas (TIG) welding.

A concurrently filed application, Ser. No. 401,473, now U.S. Pat. No. 4,450,339, N. R. Corby, Jr., "Welding Torch with Vision Attachment", assigned to the same assignee, discloses a molybdenum sleeve light blocking device on the electrode to eliminate image distortion caused by the bright arc.

While the invention has been particularly shown and described with reference to preferred embodiments thereof, it will be understood by those skilled in the art that the foregoing and other changes in form and details may be made therein without departing from the spirit and scope of the invention.

The invention claimed is:

1. An electric arc welding torch with a built-in optical vision sensor for real time observation of a weld puddle comprising:

a housing to which is attached a gas nozzle;

a metal torch body in said housing having a cover gas connection and internal passages for gas flow into said housing and nozzle, internal passages for coolant flow and incoming and exit coolant connections, one of which conducts electrical power to said torch body, and an integral electrode holder in the form of a multipart projecting arm for holding an electrode in said gas nozzle;

said torch having an integral optical vision system whose axis is approximately aligned with said electrode and which is comprised of a lens housing and optical lens mounted directly over said electrode and projecting arm, the cross section of said holder perpendicular to the optical axis being relatively small and the region between said optical vision system and gas nozzle enclosed and presenting minimum obstruction to passage of light;

said optical lens and system providing a demagnified image of the weld puddle and weld region with said holder out of focus; and means on said torch for transferring said demagnified image to a remote welding controller.

2. The welding torch of claim 1 wherein said image transferring means is a coherent fiber optic cable, and said optical vision system includes an optical filter to transmit a small range of light.

3. The welding torch of claim 2 in combination with a video camera whose output is fed to said welding controller.

4. An electric arc welding torch with an integral vision sensor for real time observation of a workpiece comprising:

a housing which supports a gas nozzle;

a metal torch body in said housing having cover gas, electrical power, and coolant connections and an integral slim profile electrode holder for holding an electrode in said gas nozzle;

wherein said electrode holder has a relatively small cross section perpendicular to the optical axis and is comprised of two stationary arms which project from said torch body and a movable center arm that clamps said electrode in said holder;

said torch having an integral optical vision system whose axis is approximately aligned with said electrode, the region between said optical vision system and gas nozzle presenting minimum obstruction to passage of light;

said optical vision system providing an image of the workpiece weld puddle and weld area with said holder not evident; and means for transferring said image to a remote system.

5. A gas tungsten arc welding torch with a built-in vision sensor for real time observation of a weld puddle and weld region comprising:

a housing to which is attached a gas cup and which supports an integral optical vision system whose axis is approximately aligned with a tungsten electrode;

a metal torch body in said housing at one side of the optical axis having internal passages for gas flow from a cover gas connection tube to said housing and gas cup, internal passages for coolant flow and coolant connection tubes, one of which conducts electrical power to said torch body, and an integral electrode holder, whose cross section perpendicular to the optical axis is relatively small, for holding said tungsten electrode in said gas cup;

said optical vision system including a lens system that is enclosed in a lens housing and directly over said electrode and holder; and a coherent fiber optic cable held in said lens housing on the optical axis;

said optical vision system providing on the face of said fiber optic cable a demagnified image of the weld puddle and weld region with said holder out of focus.

6. The welding torch of claim 5 wherein said lens housing and lens system are adjustable relative to said first-mentioned housing to focus on the weld region.

7. A gas tungsten arc welding torch with an integral vision sensor for real time observation of a workpiece comprising:

a housing which supports a gas cup and an integral optical vision system whose axis is approximately aligned with a tungsten electrode and the center of said gas cup;

a metal torch body in said housing at one side of the optical axis which has cover gas, electrical power, and coolant connections and an integral slim profile electrode holder in the form of a projecting arm;

wherein said electrode holder is a chuck and has two stationary arms and a movable center arm each with a cylindrical ring into which said tungsten electrode is inserted and clamped;

said optical vision system being sealed from the cover gas by a transparent window and directly above said electrode and holder, and providing on the face of a fiber optic cable an image of the workpiece weld puddle and weld area with said holder out of focus and not evident.

8. A concentric electric arc welding torch with a built-in vision sensor for real time observation of a workpiece weld puddle and weld region comprising:

a housing to which is attached a gas cup;

a ring-shaped metal torch body in said housing having internal channels for gas flow to said housing and gas cup and for coolant flow, and having an electrode holder in the form of an inwardly projecting arm for holding an electrode in said gas cup;

an integral optical vision system comprised of a lens system in a lens housing mounted on said ring-shaped torch body that views the workpiece through the center of said torch body and provides a demagnified image of the weld puddle and weld region with said holder out of focus;

said torch body having cover gas and coolant connections to said internal channels that are outside of said lens housing, one of said connections conducting electrical power to said torch body; and means on said torch for transferring said demagnified image to a remote welding controller.

9. The welding torch of claim 8 wherein said image transferring means is a coherent fiber optic cable, and a transparent window between said torch body and lens housing to seal the cover gas.

10. A concentric gas tungsten arc welding torch with a built-in vision sensor comprising:

a housing to which is attached a gas cup;

a generally ring-shaped copper torch body in said housing that has internal channels for gas flow to said housing and gas cup and for coolant flow, and an integral copper electrode holder in the form of a radial arm for holding a tungsten electrode approximately in the center of said gas cup;

an integral optical vision system comprised of a lens system in a lens housing that is mounted on said torch body, the region between said optical vision system and gas cup being enclosed by said lens housing, first-mentioned housing and torch body, said optical vision system having an optical axis that is approximately aligned with said electrode and providing a demagnified image of a workpiece weld puddle and weld region with said holder out of focus and not evident;

said torch body having copper cover gas and coolant connection tubes that are outside of and concentric to said optical vision system and open into said internal channels, one of said connection tubes conducting electrical power to said torch body;

a transparent window between said torch body and lens housing to seal the cover gas; and means on said torch comprising a coherent fiber optic cable for transferring said demagnified image to a video camera and welding controller.

11. The welding torch of claim 10 wherein image transferring means includes a bundle housing in which the end of said fiber optic cable is held on the optical axis, said bundle housing being adjustable relative to said lens housing to focus said demagnified image on the face of said fiber optic cable.

12. A concentric gas tungsten arc welding torch with an integral vision sensor comprising:

a housing to which is attached a gas cup;

a generally ring-shaped metal torch body in said housing that has an integral electrode holder in the form of a radial arm for holding a tungsten electrode approximately in the center of said gas cup;

wherein said electrode holder has stationary arms and a movable arm each with a ring at the end into which said electrode is inserted, and means for adjusting and clamping said movable arm;

an optical vision system having a cylindrical lens housing mounted on said torch body, and an optical axis that is approximately aligned with said electrode, and providing an image of the workpiece weld puddle and weld area with said holder out of focus and not evident;

said torch body having cover gas, electrical power, and coolant connections outside of and concentric to said lens housing; and a coherent fiber optic cable for transferring said image to a remote system.

13. The welding torch of claim 12 wherein said fiber optic cable is in a housing which is adjustable relative to said optical vision system to focus said image onto the face of said fiber optic cable.

14. The welding torch of claim 12 including a transparent heat reflecting window between said optical vision system and electrode holder which seals the cover gas.

* * * * *